United States Patent
Han et al.

(10) Patent No.: US 9,437,192 B2
(45) Date of Patent: Sep. 6, 2016

(54) METHOD AND DEVICE OF MATCHING SPEECH INPUT TO TEXT

(71) Applicant: Tencent Technology (Shenzhen) Company Limited, Shenzhen (CN)

(72) Inventors: Guiping Han, Shenzhen (CN); Hao Xu, Shenzhen (CN); Pan Zhu, Shenzhen (CN); Fei Wang, Shenzhen (CN); Ling Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 74 days.

(21) Appl. No.: 14/164,075

(22) Filed: Jan. 24, 2014

(65) Prior Publication Data

US 2014/0379335 A1 Dec. 25, 2014

Related U.S. Application Data

(63) Continuation of application No. PCT/CN2013/090468, filed on Dec. 25, 2013.

(30) Foreign Application Priority Data

Jun. 21, 2013 (CN) .......................... 2013 1 0248487

(51) Int. Cl.
- *G10L 15/00* (2013.01)
- *G10L 17/18* (2013.01)
- *G06F 3/02* (2006.01)
- *G10L 15/26* (2006.01)
- *G06F 17/22* (2006.01)

(52) U.S. Cl.
CPC .......... *G10L 15/26* (2013.01); *G06F 17/2223* (2013.01)

(58) Field of Classification Search
USPC .......................................... 704/235
See application file for complete search history.

(56) References Cited

U.S. PATENT DOCUMENTS

| | | | |
|---|---|---|---|
| 2007/0038452 A1* | 2/2007 | Blair et al. | 704/257 |
| 2008/0046824 A1* | 2/2008 | Li et al. | 715/739 |
| 2008/0183673 A1* | 7/2008 | Gao et al. | 707/3 |
| 2013/0041647 A1* | 2/2013 | Ramerth et al. | 704/2 |
| 2015/0106702 A1* | 4/2015 | Scott et al. | 715/265 |

FOREIGN PATENT DOCUMENTS

| | | |
|---|---|---|
| CN | 101377727 A | 3/2009 |
| CN | 101655837 A | 2/2010 |
| CN | 102750267 A | 10/2012 |

OTHER PUBLICATIONS

Tencent Technology (Shenzhen) Company Limited, International Search Report and Written Opinion, PCT/CN2013/090468, Apr. 3, 2014, 7 pgs.

* cited by examiner

*Primary Examiner* — David Hudspeth
*Assistant Examiner* — Timothy Nguyen
(74) *Attorney, Agent, or Firm* — Morgan, Lewis & Bockius LLP

(57) ABSTRACT

A method and device for matching speech to text are disclosed, the method including: receiving a speech input, the mentioned speech input carrying input speech information; obtaining initial text corresponding to the input speech information, and respective pinyin of the initial text; generating at least one approximate pinyin for the initial text based on predetermined pronunciation similarity information; and from a preset mapping relationship table, obtaining additional text corresponding to the respective pinyin of the initial text or to the at least one approximate pinyin of the initial text, wherein the preset mapping relationship table includes a respective record for each word in a word database, including respective pinyin and at least one respective approximate pinyin for said each word, and a respective mapping relation between said respective pinyin, said at least one respective approximate pinyin, and said each word.

18 Claims, 3 Drawing Sheets

METHOD AND DEVICE OF MATCHING SPEECH INPUT TO TEXT

RELATED APPLICATIONS

This application is a continuation application of PCT Patent Application No. PCT/CN2013/090468, entitled "METHOD AND DEVICE OF MATCHING SPEECH INPUT TO TEXT" filed Dec. 25, 2013, which claims priority to Chinese Patent Application Serial No. 201310248487.0, entitled "METHOD AND DEVICE FOR SPEECH INPUT MATCHING" filed Jun. 21, 2013, both of which are incorporated herein by reference in the entirety.

FIELD OF THE INVENTION

The present invention relates to the information technology field, especially relates to a method and device of matching speech input to text.

BACKGROUND OF THE INVENTION

With the continuous development of user terminal devices (e.g., personal computers, smart phones, tablet devices, etc.), the functions of user terminal devices have become increasingly diverse. Among which, corresponding operations can be conducted by a terminal device based on the information input by a user. The existing word input mode is mainly divided into keyboard input modes and non-keyboard input modes, while among the non-keyboard input modes, a most frequently used mode is the speech input mode. Speech input mode is described specifically as: the terminal device converts the speech information input by the user into corresponding textual words for displaying, furthermore, the corresponding operations can be conducted based on the speech information input by the user.

However, when user inputs the speech information by the speech input mode, due to different pronunciations of local dialects as well as the pronunciation confusability between different pronunciation units for people of a particular dialect or language. For example, in Chinese PinYin, the pronunciation confusability between alveolar and retroflex sounds (e.g., z-zh, c-ch, and s-sh), nasal and lateral sounds (e.g., n-l) are prevalent. This causes the words matched to the speech input of the user to be different from the actual words that the user intents to be matched. At the present, most terminal devices only notifies the user of the failure to match the speech input at this time, which results in the relatively low success rate of the existing speech input matching technology.

SUMMARY

In some embodiments, a method of matching speech to text includes: at a device having one or more processors and memory: receiving a speech input, the mentioned speech input carrying input speech information; obtaining initial text corresponding to the input speech information, and respective pinyin of the initial text; generating at least one approximate pinyin for the initial text based on predetermined pronunciation similarity information; from a preset mapping relationship table, obtaining additional text corresponding to the respective pinyin of the initial text or to the at least one approximate pinyin of the initial text, wherein the preset mapping relationship table includes a respective record for each word in a word database, including respective pinyin and at least one respective approximate pinyin for said each word, and a respective mapping relation between said respective pinyin, said at least one respective approximate pinyin, and said each word.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

As described in the background section, the current technology of matching speech input to text suffers from the shortcoming of low success rate when the speech input received from the user contains non-standard pronunciations of certain sounds due to the pronunciation differences between the standard and regional dialects in a spoken language system (e.g., Mandarin Chinese) and easy confusability of certain pronunciation units in the spoken language system for people who speak various regional dialects (e.g., the pronunciations for "l" and "n", "r" and "l", "an" and "ang", "s" and "sh", "c" and "ch", and "z" and "zh", etc. in Pinyin are easily confused for people from the southern provinces in China).

In the present disclosure, a method for generating fuzzy matching between sets of standard and non-standard but common pronunciations of sounds, syllabus, and/or words is disclosed. Based on the fuzzy matching, the low success rate for matching a speech input to a meaningful text output may be improved.

Figure 1:
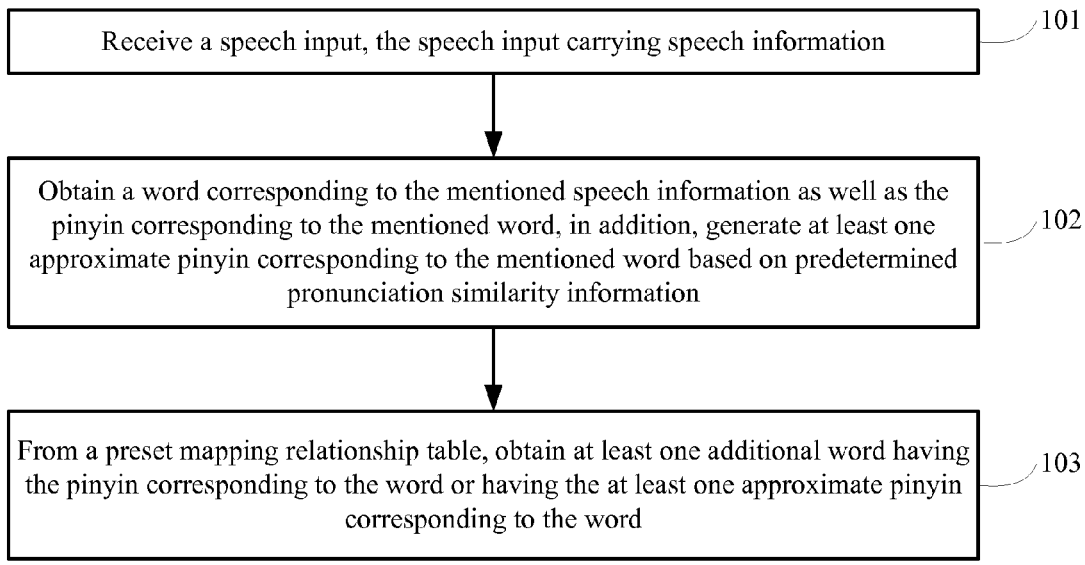
FIG. 1 is the flowchart diagram of a method of matching speech input to text in accordance with some embodiments.

In some embodiments, a method of matching speech input to text is shown in FIG. 1. The mentioned method includes:

101, a terminal device receives a speech input, where the speech input contains speech information.

In some embodiments, the speech input is a verbal instruction for a computer program (e.g., a voice-based digital assistant or controller). In some embodiments, the speech input is input for a dictation process. In some embodiments, the speech input includes names and proper nouns for people, location, businesses, etc. The speech input received by the terminal device carries input speech information (e.g., sound waves corresponding to characters and/or words in a natural language).

For example, in some embodiments, a user may provide a speech input such as "Call Wangwu." When receiving this speech input, the terminal device, based on words corresponding to the speech information contained in the received speech input, searches for the name "Wangwu" from a contact list of the user, and then performs a calling operation to call the contact number associated with the name "Wangwu."

102, the terminal device obtains text corresponding to the mentioned speech information and the pinyin corresponding to the mentioned text. In addition, the terminal device generates, based on predetermined pronunciation similarity information, at least one "approximate pinyin" for the mentioned pinyin corresponding to the mentioned text. In some embodiments, the predetermined pronunciation similarity information specify words that are commonly pronounced with non-standard pronunciations due to high confusability of sounds in the standard pronunciations of the words and different pronunciation habits of regional dialects. For example, the predetermined pronunciation similarity information optionally specifies the standard pinyin for the word "人" as "ren", and the approximate pinyin for the word "人" as "yin". In another example, the predetermined pronunciation similarity information optionally specifies the standard pinyin for the word "是" as "shi", and the approximate pinyin for the word "是" as "si". In another example, the predetermined pronunciation similarity information optionally specifies the standard pinyin for the character "农" as "nong", and the approximate pinyin for the character "农" as "long". In some embodiments, the predetermined pronunciation similarity information specifies sounds that are commonly confused in a spoken language. For example, pairs of sound units that are easily confused may be listed in a table or other storage structure. In some embodiments, pairs of alveolar and retroflex sounds (e.g., z-zh, c-ch, and s-sh), pairs of nasal and lateral sounds (e.g., n-l), and pairs of compound vowels and their corresponding nasal compound vowels (e.g., an-ang, en-eng, in-ing, etc.) are optionally specified in the pronunciation similarity information. Although the above example uses the Chinese language, and Pinyin as an illustrated example. Similar problem and solution exist for other languages. For example, in English, consonants and vowels that are easily confused in speech (e.g., /t/–/θ/, /i:/–/i/, etc.) can be included in the pronunciation similarity information.

In some embodiments, the method through which the terminal device obtains the text corresponding to the speech information include: the terminal device obtains the text corresponding to the speech information from a back-end server. In addition, the back-end server converts the speech information into corresponding text. In some embodiments, software programs for converting speech information into corresponding text is preinstalled on the terminal device, such that the terminal device directly obtains the text corresponding to the speech information locally at the terminal device.

In some embodiments, the terminal device processes the pronunciation of the text using one or more different approximation processing modes. Based on the different approximation processing modes, the terminal device generates one or more approximate pinyin corresponding to the text. In some embodiments, the one or more approximate pinyin corresponding to the text optionally belong to different similarity grades as compared to the standard pinyin of the text.

For example, in some embodiments, an alveolar-retroflex sound conversion (e.g., conversion between "z" and "zh", "c" and "ch", "s" and "sh" sounds in PinYin) of the word's pronunciation (e.g., the standard pronunciation of the word as specified in PinYin) is carried out to generate a corresponding first-grade approximate pinyin for the word. In some embodiments, a nasal-lateral sound conversion (e.g., conversion between the "l" and "n" sounds in PinYin) of the word's pronunciation is carried out in addition to the alveolar-retroflex sound conversion to generate a corresponding second-grade approximate pinyin for the word. Other types of conversions are possible. In some embodiments, the selection of the type(s) of conversions for each grade of approximation is made dependent on the natural language in use at the terminal device.

103, the terminal device, from a preset mapping relationship table, obtains additional text corresponding to the pinyin matching the text, and/or additional text corresponding to the at least one approximate pinyin for the pinyin matching the text.

In some embodiments, the mentioned preset mapping relationship table records the respective pinyin corresponding to each of a plurality of words and at least one approximate pinyin corresponding to each of the plurality of words in the word database to be matched against. The mentioned preset mapping relationship also specifies the respective association between each of the mentioned pinyin and their respective approximate pinyin. In some embodiments, the mapping relationship table includes the approximate pinyin of each word and its standard pinyin in different approximation grades. Below is an example mapping relationship table in accordance with some embodiments:

| Word | Standard Pinyin | Grade 1 Approximate Pinyin | Grade 2 Approximate Pinyin | Grade 3 Approximate Pinyin | Grade 4 Approximate Pinyin |
| --- | --- | --- | --- | --- | --- |
| 仍然 | rengran | renran, lengran | renlan, lenglan | lenglang | nenglan |
| 云彩 | yuncai | yunchai, yincai | yingcai, yunchai | yingchai | |

In some embodiments, the approximate pinyin in each grade are generated using a respective set of conversions applied to the standard pinyin. In some embodiments, a higher grade approximate pinyin (e.g., grade 2 is higher than grader 1) includes more conversions than a lower grade approximate pinyin. In some embodiments, a higher grade approximate pinyin for one word includes all of the conversions used in a lower grade approximate pinyin of the same word. In some embodiments, the approximate pinyin for each standard for each grade may be generated using different conversions, and the respective grade of each approximate pinyin is determined based on how frequently the approximate pinyin is used be people to represent the word.

In some embodiments, the words saved in the word database to be matched against include the names of contacts in a user's contact list, the names of songs saved in the terminal device, and so on. Other names, proper nouns, special terms may be stored in the word database as well, and a word mapping table entry can be created for all of the words in the word database or a subset of words that are frequently pronounced in a variety of ways by people due to accents and regional habits.

In some embodiments, the terminal device obtains from the preset mapping relationship table the standard pinyin matching the pinyin corresponding to the text and/or the standard pinyin matching the at least one approximate pinyin corresponding to the text, and then obtains additional text corresponding to the standard pinyin that have been obtained from the table. For example, if the text obtained through the speech information is "人瓤" with a standard pinyin of "renrang," then at least one approximate pinyin is generated for "renrang" using various approximation conversion processing techniques. In this example, an approximate pinyin for "renrang" is "renran" and "rengran". Then, respective text entries corresponding to the pinyin and approximate pinyin (e.g., "renrang", "renran", and "rengran" are obtained from the mapping relationship table (e.g., the text entries including "仍然" are obtained). In some embodiments, the number of text entries obtained may be fewer than the number of pinyin used to search the mapping table, since multiple approximate pinyin and the standard pinyin may correspond to the same text. Although in this example, the text is not a proper name or noun, the technique used would apply particularly well to databases that contain people's names. In such cases, the chances of ambiguous search results would be reduced.

In some embodiments, the approximate pinyin corresponding to each word in the word database can be categorized into different approximation grades according to the pronunciation similarity between the approximate pinyin and the standard pinyin in descending order. For example, the grade of pinyin with same pronunciation is categorized as fully matching (i.e., zero grade approximation), the grade of pinyin with the highest degree of similarity is categorized as a first-grade approximation. By analogy, the rest of the approximate pinyin are categorized further as second-grade approximations, third-grade approximations, and so on, according to the respective degrees of similarity in pronunciation in descending order.

In some embodiments, the first-grade approximation processing rule can be described specifically as: generating corresponding approximate pinyin through the use of (1) an alveolar-retroflex sound conversion, (2) a nasal-lateral sound conversion, (3) a confounding initial sound conversion (e.g., conversion between similar sounding initials in PinYin, e.g., conversion between "t" and "d", "b" and "p", etc.), or (4) a confounding final sound conversion (e.g., conversion between similar sounding finals in PinYin, e.g., conversion between "an" and "ang", "u" and "o", "e" and "o", "en" and "eng", etc.) for the pronunciation of word. In some embodiments, the second-grade approximation processing rule can be described specifically as: generating corresponding approximate pinyin through the use of (1) both an alveolar-retroflex sound conversion and a nasal-lateral sound conversion, (2) both an alveolar-retroflex sound conversion and a confounding initial sound conversion, (3) both an alveolar-retroflex sound conversion and a confounding final sound conversion, (4) both a nasal-lateral sound conversion and a confounding initial sound conversion, (5) both a nasal-lateral sound conversion and a confounding final sound conversion, or (6) both a confounding initial sound conversion and a confounding final sound conversion. In some embodiments, the third-grade approximation processing rule can be described specifically as: generating corresponding approximation pinyin by using only the pinyin for the first character of the word. For example, the third-grade approximate pinyin for "wangwu" is "wang" where "" can be the pinyin for any character(s). For example, in some embodiments, if the speech is a name, the third-grade approximate pinyin of the name includes just the family name match. In some embodiments, the fourth-grade approximation processing rule can be described specifically as: generating corresponding approximate pinyin by the use of a combination of an alveolar-retroflex sound conversion, a nasal-lateral sound conversion, and a confounding initial or final sound conversion. In some embodiments, the fourth-grade approximate pinyin can also be generated by making a combination of an alveolar-retroflex sound conversion, a nasal-lateral sound conversion, and the masking of one or more initial sounds in the pinyin corresponding to the initially recognized text (e.g., the approximate pinyin for "ta" can be "pa" or "da", when the initial sound "t" is masked). In some embodiments, the fifth-grade approximation processing rule can be described specifically as: generating corresponding approximate pinyin through the use of a combination of an alveolar-retroflex sound conversion, a nasal-lateral sound conversion, the masking of one or more initial sounds in the pinyin corresponding to the initially recognized text, and a confounding initial or final sound conversion.

It should be noted that numbers of approximation grades of approximate pinyin and the processing rules for each approximation grade can be configured flexibly according to actual demand, and may be different in different embodiments.

In some embodiments, a method of matching speech input to text includes, firstly, receiving the speech input, the mentioned speech input carrying input speech information; secondly, obtaining the text corresponding to speech information and pinyin corresponding to the mentioned text, in addition, generating at least one approximate pinyin corresponding to the mentioned text based on predetermined pronunciation similarity information, at last, obtaining additional text corresponding to the pinyin of the initially obtained text, and additional text corresponding to the at least one approximate pinyin from a preset mapping relationship table. Conventionally, if the text corresponding to the speech information input by user does not match with the actual word the user intended to be matched, the terminal device have to notify the user of the failure to match the speech input. In contrast, the method described herein allow the terminal device to conduct both full matching of the speech input, and approximate matching using the pinyin of the word corresponding to speech information. Thus, this method can improve the matching accuracy of speech input and the matching success rate of speech input.

Figure 2:
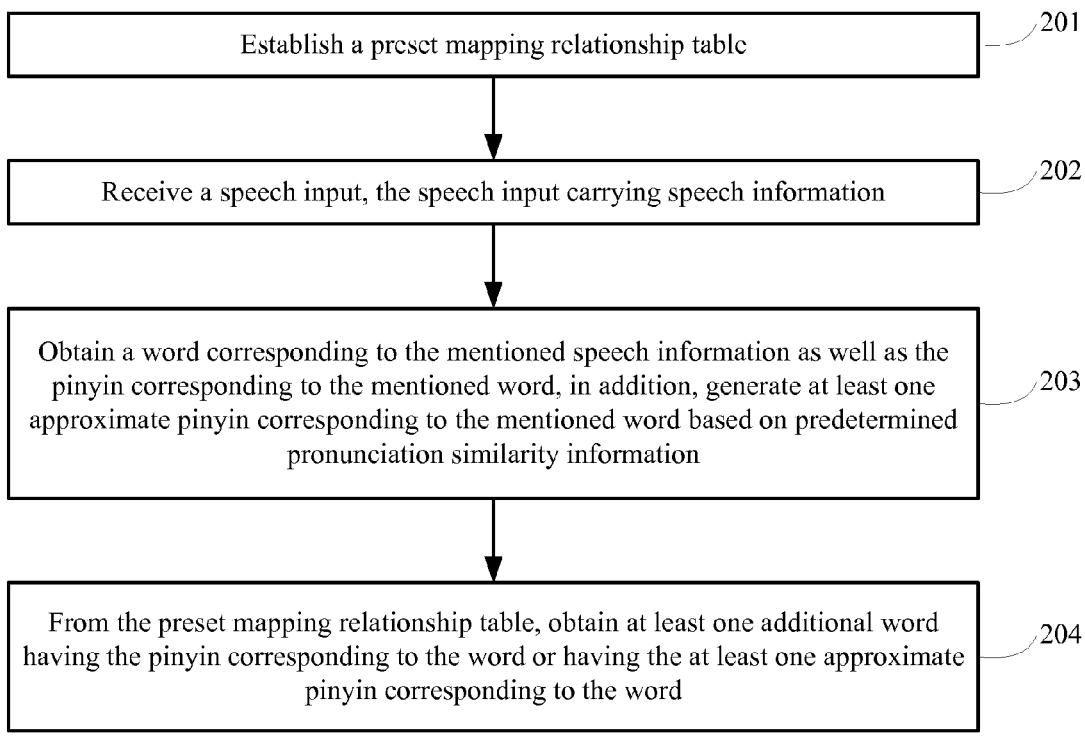
FIG. 2 is flowchart diagram of a method of matching speech input to text in accordance with some embodiments.

In some embodiments, a method of matching word input is illustrated in FIG. 2, the mentioned method includes:

201, a device (e.g., a terminal device or a server) establishes the preset mapping relationship table.

In some embodiments, the mentioned preset mapping relationship table records the pinyin corresponding to each word and at least one approximate pinyin corresponding to each word in the word database to be matched against, and the mapping relationship between the mentioned pinyin, the mentioned at least one approximate pinyin, and the word. In some embodiments, the words saved in the word database to be matched against include the names of contacts in a contact list, the name of songs saved in the terminal device, and so on. More details regarding the preset mapping table are disclosed above with respect to FIG. 1.

In some embodiments, Step 201 can include the following sub-steps: first, each word in the word database to be matched against is converted to corresponding standard pinyin. Then, at least one approximate pinyin corresponding to the mentioned each word is generated according to predetermined pronunciation similarity information. At last, the mapping relationship between each word in the word database, the mentioned standard pinyin for the word, the mentioned at least one approximate pinyin for the word are generated, and the mentioned mapping relationships are recorded in the mentioned preset mapping relationship table.

In some embodiments, after Step 201, the method can also include: establishing a dictionary Trie for the respective pinyin and at least one approximate pinyin corresponding to the mentioned each word in the word database. Through establishing the Trie and searching the pinyin corresponding to the input word and the pinyin matching the corresponding approximate pinyin in the Trie, the matching efficiency of word input can be further improved.

In some embodiments, the method includes classifying the saved words in the word database in advance. For example, the word database can be divided into words that are contact names of a contact list and words that are song names for songs saved in the terminal device as two different types. Then, respective dictionary tries can be established for matching words with pinyin and approximate pinyin in each category of words. This can further improve the matching efficiency of word input. Further, in some embodiments, the last letter of a pinyin for a word can be tagged with the similarity grade for the pinyin (e.g., full match, 1st grade approximation, 2nd grade approximation, etc.).

202, the device receives a speech input.

The mentioned speech input carries input speech information. For example, when a user provides a speech input containing the speech information "Call Wangwu", the device, based on text corresponding to the speech information (e.g., as identified by an acoustic speech-to-text converter), searches for "Wangwu" from a contact list to determine the callee's number, and then performs the calling operation with the identified callee's number.

203, the device obtains text corresponding to the mentioned speech information and the pinyin corresponding to the mentioned text. In addition, the terminal device generates, based on predetermined pronunciation similarity information, at least one approximate pinyin for the mentioned pinyin corresponding to the mentioned text.

In some embodiments, the device can adopt any one kind or any combination of the following approximation processing methods to process the word's pronunciation, and generate the approximate pinyin of different approximation grades corresponding to the word. In some embodiments, the mentioned approximation processing methods includes: an alveolar-retroflex sound conversion, a nasal-lateral sound conversion, a confounding initial sound conversion, a confounding final sound conversion, using only the pinyin for the first character of the word for matching, masking of one or more initial sounds in the pinyin corresponding to the initially recognized text, etc.

In some embodiments, when conducting an alveolar-retroflex sound conversion for the pronunciation of a word corresponding to the input speech information, and generating the approximate pinyin of the mentioned word, if the word corresponding to the input speech information is 张二丰, the corresponding pinyin is "zhangshanfeng", after the alveolar-retroflex sound conversion which replaces "zh" and "sh" with "z" and "s", the approximate pinyin corresponding to word is "zangsanfeng".

In some embodiments, when conducting nasal-lateral sound conversion for the pronunciation of a word corresponding to the input speech information, and generating the approximate pinyin of the mentioned word, if the word corresponding to the input speech information is 王妮, the corresponding pinyin is "wangni", after the nasal-lateral sound conversion which replaces "n" with "l", the approximate pinyin corresponding to words is "wangli", and the matching word is 王丽 in Chinese.

In some embodiments, when conducting a confounding initial sound conversion for the pronunciation of a word corresponding to the input speech information, and generating the approximate pinyin of the mentioned word, if the word corresponding to the input speech information is 吃换, the corresponding pinyin is "chihuan", after the confounding initial sound conversion which replaces the initial "hu" to be the initial "f", the approximate pinyin corresponding to the word is "chifan", and the matching word is 吃饭.

In some embodiments, conducting a confounding final sound conversion for the pronunciation of a word corresponding to the input speech information, and generating the approximate pinyin of the mentioned word, if the word corresponding to the input speech information are 难和, the corresponding pinyin is "nanhe", after the confounding final sound conversion which replaces the final "an" to be a final "uan", the approximate pinyin corresponding to the word is "nuanhe", the matching word is 暖和.

In some embodiments, when using only the first character of the pronunciation of a word corresponding to the input speech information for matching, and generating the approximate pinyin of the mentioned word, if the word corresponding to the input speech information is 张三峰, the corresponding pinyin is zhangshanfeng, after the above processing for matching just the first Chinese character, the approximate pinyin corresponding to the word is "zhang", the matching word is 张, and thus making the terminal device obtain all names with surname of 张 as the matching result.

In some embodiments, when masking of one or more initial sounds in the pronunciation of a word corresponding to the input speech information, and generating the approximate pinyin of the mentioned word, if the word corresponding to the input speech information is 吃换, the corresponding pinyin is "chihuan", after masking the confounding initial(s) which replaces the initial "hu" in the pinyin "huan" with a specific identifier (e.g., a wildcard identified by an exclamation point, or an asterisk, and so on), the approximate pinyin corresponding to the word is "chi ! an", and the matching word is 吃饭 which has a pinyin of "chifan".

204, from the preset mapping relationship table, the device obtains additional matching word for the pinyin corresponding to the initially identified word or additional matching word for the at least one approximate pinyin corresponding to the initially identified word.

In some embodiments, Step 204 can include: first, according to the degrees of pronunciation similarity in a descending order, the device successively determines whether the pinyin corresponding to the word and at least one approximate pinyin corresponding to the word has a pinyin match in the mentioned preset mapping relationship table. If there exist one or more pinyin in the mentioned preset mapping relationship table to match the pinyin and approximate pinyin of the word, the device obtains the additional words corresponding to the mentioned matching pinyin according to the mentioned preset mapping relationship table. Through conducting pinyin matching according to the descending order of word pronunciation similarity, it is possible to ensure that the final obtained word is the closest to the word the user intends, and thus improving the matching success rate of word input.

In some embodiments, Step 204 can include: first, according to the degrees of pronunciation similarity in a descending order, the device successively determines whether the pinyin corresponding to the word and at least one similar pinyin corresponding to the word has a pinyin match in the mentioned dictionary Trie. If there exists one or more pinyin in the mentioned Trie to match the pinyin and approximate pinyin of the word, the device obtains the additional words corresponding to the mentioned matching pinyin according to the mentioned mapping relationship table. Through conducting pinyin matching and searching in the Trie, it can also further improve the matching efficiency of word input.

In some embodiments, in an exemplary usage scene of an embodiment of the present invention: a terminal device receives a speech input of "打电话给张山峰" (meaning "Call zhangshanfeng" in English); the terminal device obtains the contacts of the user, including 张三丰 (with pinyin "zhangsanfeng"), 张无忌 (with pinyin "zhangwuji") and 王五 (with pinyin "wangwu") in the contact list from a word database to be matched against. First, the terminal device transforms the words of the contact names into their corresponding pinyin, i.e., "zhangsanfeng", "zhangwuji" and "wangwu", and obtains at least one approximate pinyin according to predetermined pronunciation similarity information. Specifically, the device obtains the approximate pinyin of each word according to the rules for different approximation grades. For example, after performing the alveolar-retroflex sound conversion for the word pronunciations, the respective approximate pinyin corresponding to the words becomes "zangsanfeng", "zangwuji", and "wangwu". The device then establishes the mapping relationship table between the contact names, the corresponding pinyin and the corresponding approximate pinyin. Then, the device transforms the input word "张山峰" recognized from the speech input received from the user, into pinyin "zhangshanfeng", and determines that there is no matched pinyin for "zhangshanfeng" in the mapping relationship table. According to conventional technology, the terminal device will prompt the user that no matched content was found at this moment, thus resulting in the matching failure of the user's speech input this time. However, by conducting a grade 1 approximation processing including an alveolar-retroflex sound conversion for the pronunciation of the word "张山峰", the device creates approximate pinyin "zangsanfeng". The device determines that there is a matching pinyin for "zangsanfeng" in the mapping relationship table at this moment, and the word corresponding to "zangsanfeng" in the mapping relationship table is "张三丰". Thus, the device has successfully obtained the word "张三丰" by matching the input speech information, and improves the matching success rate of speech input.

In some embodiments, a method of matching speech input to text includes, firstly, receiving the speech input, the mentioned speech input carrying input speech information; secondly, obtaining the text corresponding to speech information and pinyin corresponding to the mentioned text, in addition, generating at least one approximate pinyin corresponding to the mentioned text based on predetermined pronunciation similarity information, at last, obtaining additional text corresponding to the pinyin of the initially obtained text, and additional text corresponding to the at least one approximate pinyin from a preset mapping relationship table. Conventionally, if the text corresponding to the speech information input by user does not match with the actual word the user intended to be matched, the terminal device have to notify the user of the failure to match the speech input. In contrast, the method described herein allow the terminal device to conduct both full matching of the speech input, and approximate matching using the pinyin of the word corresponding to speech information. Thus, this method can improve the matching accuracy of speech input and the matching success rate of speech input.

Figure 3:
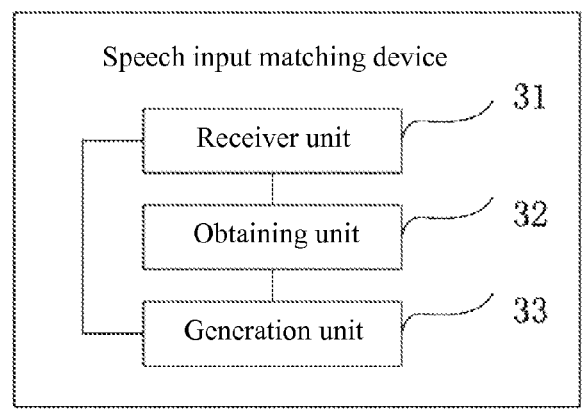
FIG. 3 is a schematic diagram showing the structure of a device for matching speech input to text in accordance with some embodiments.

Further, a speech input matching device is shown in FIG. 3. The mentioned device can be applied in a terminal device, e.g., a smart phone, a computer, or a laptop, to perform the methods described above. In some embodiments, the mentioned device includes receiver unit 31, obtaining unit 32 and generation unit 33.

Receiver unit 31 is configured to receive a speech input, where the speech input contains speech information.

Obtaining unit 32 is configured to obtain text corresponding to the mentioned speech information and the pinyin corresponding to the mentioned text.

Generation unit 33 is configured to generate, based on predetermined pronunciation similarity information, at least one "approximate pinyin" for the mentioned pinyin corresponding to the mentioned text.

Obtaining unit 32 is configured to, from a preset mapping relationship table, obtain additional text corresponding to the pinyin matching the text, and/or additional text corresponding to the at least one approximate pinyin for the pinyin matching the text. In some embodiments, the mentioned preset mapping relationship table records the respective pinyin corresponding to each of a plurality of words and at least one approximate pinyin corresponding to each of the plurality of words in the word database to be matched against.

In some embodiments, the device may include other corresponding functional units for performing other functions described above with respect to the methods in FIG. 1.

Figure 4:
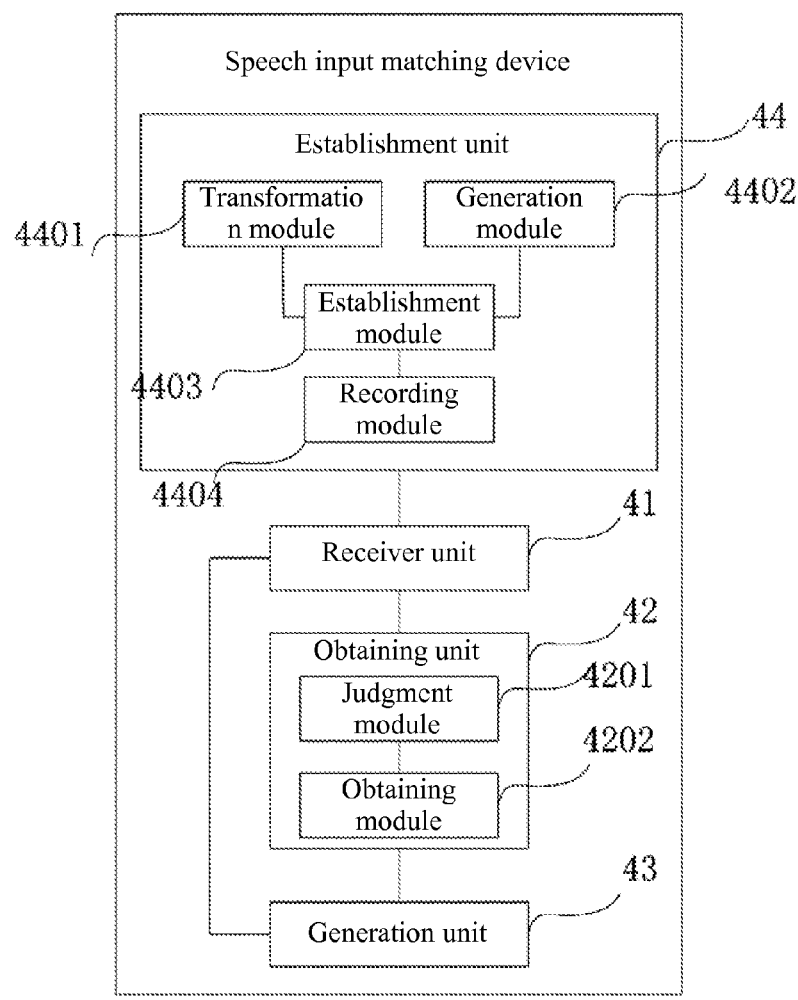
FIG. 4 is a schematic diagram showing the structure of a device for matching speech input to text in accordance with some embodiments.

Further, a speech input matching device is shown in FIG. 4. The mentioned device can be applied in a terminal device, e.g., a smart phone, a computer, or a laptop, to perform the methods described above. In some embodiments, the mentioned device includes receiver unit 41, obtaining unit 42, generation unit 43 and establishment unit 44.

Receiver unit 41 is configured to receive a speech input, where the speech input contains speech information.

Obtaining unit 42 is configured to obtain the word corresponding to the mentioned speech information and the pinyin corresponding to the mentioned word that received by the mentioned receiver unit 41.

Generation unit 43 is configured to generate at least one approximate pinyin corresponding to the mentioned word according to predetermined pronunciation similarity information.

Obtaining unit 42 is configured to obtain additional word(s) corresponding to the pinyin of the above-mentioned word and/or additional word(s) corresponding to the at least one approximate pinyin of the above-mentioned word, from the preset mapping relationship table. In some embodiments, the mentioned preset mapping relationship table records the respective pinyin corresponding to each of a plurality of words and at least one approximate pinyin corresponding to each of the plurality of words in the word database to be matched against. The mentioned preset mapping relationship also specifies the respective association between each of the mentioned pinyin and their respective approximate pinyin.

Establishment unit 44 is configured to establish the mentioned preset mapping relationship table before the receiver unit 41 receives the speech input.

In some embodiments, Establishment unit 44 can include: Transformation module 4401, Generation module 4402, Establishment module 4403, and Recording module 4404.

Transformation module 4401 is configured to transform each word in the mentioned word database to be matched against to corresponding pinyin.

Generation module 4402 is configured to generate at least one approximate pinyin corresponding to the mentioned each word in the word database according to predetermined pronunciation similarity information.

Establishment module 4403 is configured to establish the mapping relationship between the mentioned pinyin transformed by the mentioned transformation module 4401, the mentioned at least one approximate pinyin generated by generation module 4402 and said each word in the mentioned word database to be matched against.

Recording module 4404 is configured to record the mentioned mapping relationship established by the establishment module 4403 in the mentioned preset mapping relationship table.

In some embodiments, Obtaining unit 42 can include: Judgment module 4201, and Obtaining module 4202.

Judgment module 4201 is configured to successively determine whether the pinyin corresponding to the inputted word (i.e., the initially recognized text through acoustic speech recognition using the speech information in the received speech input) and the at least one approximate pinyin corresponding to the inputted word has a matching pinyin in the mentioned preset mapping relationship table, where the determination is made in a descending order according to the pronunciation approximation grades.

Obtaining module 4202 is configured to obtain the word corresponding to the mentioned matching pinyin identified according to the mentioned preset mapping relationship table, if the mentioned judgment module 4201 determines that there exists a matching pinyin in the mentioned preset mapping relationship table for the pinyin and approximate pinyin of the word.

Establishment unit 44 is configured to establish a Trie for matching the pinyin and the at least one approximate pinyin corresponding to the mentioned each word.

Judgment module 4201 is configured to successively determine whether the pinyin corresponding to the word and at least one approximate pinyin corresponding to the word has a matching pinyin in the Trie according to a descending order of the pronunciation approximation grades.

Obtaining module 4202 is configured to obtain additional word(s) corresponding to the mentioned matching pinyin identified according to the mentioned preset mapping relationship table, if there exists a matching pinyin in the Trie.

Generation unit 43 is configured to conduct an alveolar-retroflex sound conversion for the pronunciation of the mentioned word and generate the approximate pinyin corresponding to the mentioned word; and/or conduct a nasal-lateral sound conversion for the pronunciation of the mentioned word and generate the approximate pinyin corresponding to the mentioned word; and/or conduct a confounding initial sound conversion for the pronunciation of the mentioned word and generate the approximate pinyin corresponding to the mentioned word; and/or conduct a confounding final sound conversion for the pronunciation of the mentioned word and generate the approximate pinyin corresponding to the mentioned word.

In some embodiments, the device may include other corresponding functional units for performing other functions described above with respect to the methods in FIG. 1.

In some embodiments, a method of speech input matching includes: firstly, receiving a speech input, and the mentioned speech input carrying input speech information; secondly, obtaining a word corresponding to the speech information and respective pinyin corresponding to the mentioned word; in addition, generating at least one approximate pinyin corresponding to the mentioned word based on predetermined pronunciation similarity information; at last, obtaining additional word(s) matching the pinyin corresponding to word or additional word(s) matching the at least one approximate pinyin corresponding to word, from a preset mapping relationship table. Conventionally, if the word corresponding to the speech information input by user does not match the actual word intended by the user, the terminal device has to prompt the failure of the speech input matching at this time. In contrast, the method in which the terminal device conducts both full matching and approximate matching of pinyin improves the matching accuracy of speech input and the matching success rate of speech input.

Figure 5:
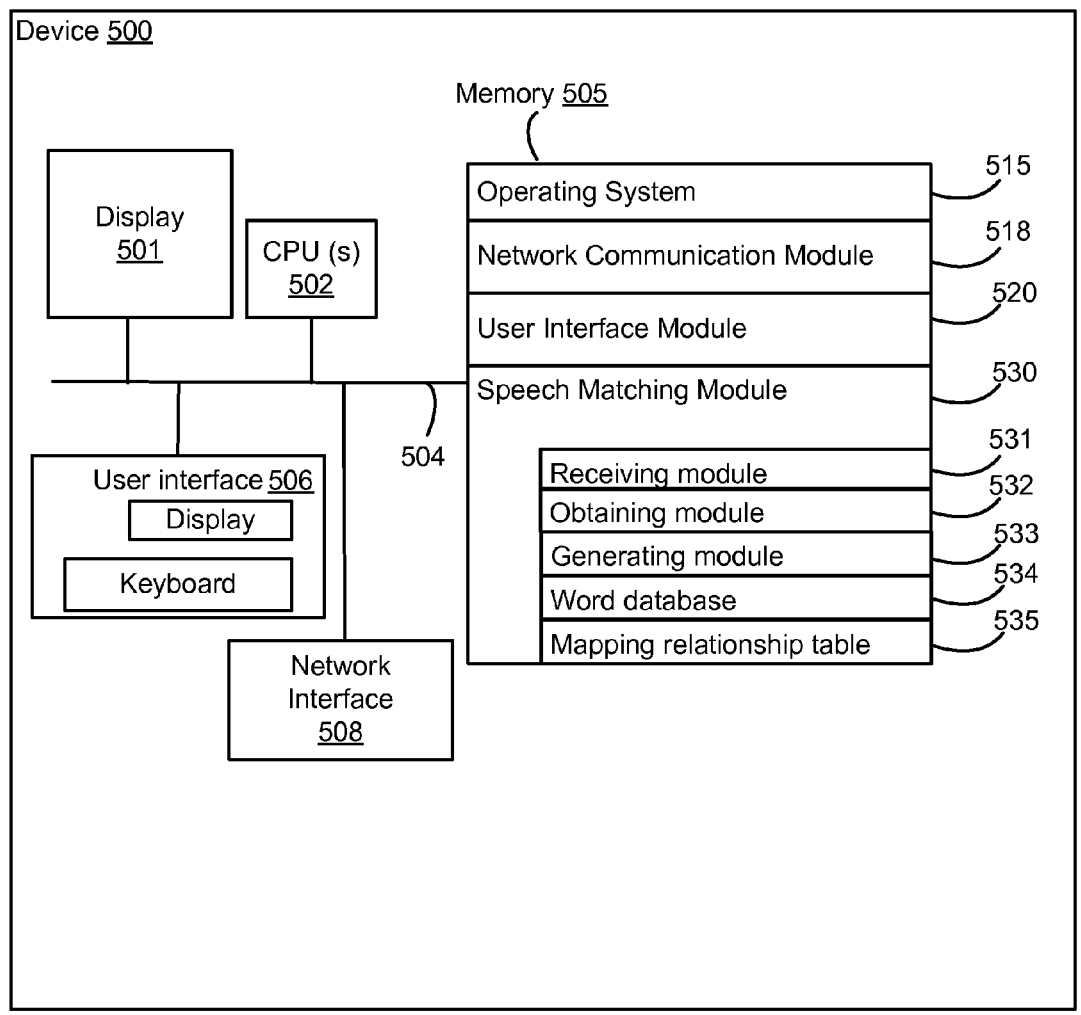
FIG. 5 is a block diagram of a device in accordance with some embodiments.

FIG. 5 is a diagram of an example device 500 for implementing the above methods and devices in accordance with some embodiments. In some embodiments, the device 500 includes one or more processing units (CPU's) 502, one or more network or other communications interfaces 508, a display 501, memory 505, and one or more communication buses 504 for interconnecting these and various other components. The communication buses may include circuitry (sometimes called a chipset) that interconnects and controls communications between system components. The memory 505 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 505 may optionally include one or more storage devices remotely located from the CPU(s) 502. The memory 505, including the non-volatile and volatile memory device(s) within the memory 505, comprises a non-transitory computer readable storage medium.

In some implementations, the memory 505 or the non-transitory computer readable storage medium of the memory 505 stores the following programs, modules and data structures, or a subset thereof including an operating system 515, a network communication module 518, a user interface module 520, and a speech matching program 530.

The operating system 515 includes procedures for handling various basic system services and for performing hardware dependent tasks.

The network communication module 518 facilitates communication with other devices via the one or more communication network interfaces 508 (wired or wireless) and one or more communication networks, such as the Internet, other wide area networks, local area networks, metropolitan area networks, and so on.

The user interface module 520 is configured to receive user inputs through the user interface 506.

The speech matching module 530 is configured to perform the methods for matching speech to text as described above. The speech matching module 530 comprises receiving module 531 (e.g., the receiving unit 31 in FIG. 3), an obtaining module 532 (e.g., the obtaining unit 32 in FIG. 3), and a generation module 533 (e.g., the generation unit 33 in FIG. 3). The speech matching module 530 also includes word database 534 and mapping relationship table 535. The speech matching module 530 optionally includes other modules and sub-modules for performing other operations described above with respect to various embodiments.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of matching speech to a contact name in a user's list of contacts, comprising:
   at a device having one or more processors and memory:
   storing the list of the user's contacts in the memory, wherein the list of the user's contacts includes a first contact;
   receiving input speech information;
   obtaining initial text corresponding to the input speech information and standard pinyin of the initial text;
   generating at least one approximate pinyin for the initial text based on predetermined pronunciation similarity information, wherein the pronunciation similarity information identifies non-standard pronunciations based on regional dialects;
   from a preset mapping relationship table stored in the memory, obtaining alternative text corresponding to the approximate pinyin of the initial text, wherein:
      the preset mapping relationship table includes a record for each word in a word database, the record including standard pinyin and approximate pinyin for the word, and a mapping relation between the standard pinyin, approximate pinyin, and the word; and
      the alternative text includes one or more words whose standard pinyin or approximate pinyin map, in the preset mapping relationship table, to the approximate pinyin of the initial text;
   matching the alternative text to the first contact; and
   performing an operation using the first contact.

2. The method of claim 1, further comprising:
   establishing the preset mapping relationship table, comprising, for each word in the word database:
      converting the word to corresponding standard pinyin;
      using the standard pinyin, generating at least one approximate pinyin according to the predetermined pronunciation similarity;
      establishing the mapping relationship between the standard pinyin, the approximate pinyin, and the word; and
      storing the respective mapping relationship for the word in the preset mapping relationship table.

3. The method of claim 2, wherein establishing the preset mapping relationship table further includes establishing a dictionary Trie for the standard pinyin and the at least one approximate pinyin corresponding to each word in the word database.

4. The method of claim 2, wherein the words in the word database are divided into a plurality of categories and a respective dictionary Trie is established for each of the plurality of categories.

5. The method of claim 1, wherein the preset mapping relationship table includes respective approximate pinyin of different approximation grades corresponding to each word in the word database.

6. The method of claim 5, wherein obtaining the alternative text corresponding to the approximate pinyin of the initial text further comprises:
   according to a descending order of the different approximation grades, successively determining whether the standard pinyin of the initial text matches pinyin in the preset mapping relationship table; and
   in accordance with a determination that the standard pinyin of the initial text matches pinyin in the preset main relationship table, obtaining, as the alternative text, text corresponding to the one or more matching pinyin identified according to the preset mapping relationship table.

7. A system, comprising:
   one or more processors; and
   memory storing instructions which, when executed by the one or more processors, cause the processors to perform operations comprising:
   storing a list of a user's contacts in the memory, wherein the list of the user's contacts includes a first contact;
   receiving input speech information;
   obtaining initial text corresponding to the input speech information and standard pinyin of the initial text;
   generating at least one approximate pinyin for the initial text based on predetermined pronunciation similarity information, wherein the pronunciation similarity information identifies non-standard pronunciations based on regional dialects;
   from a preset mapping relationship table stored in the memory, obtaining alternative text corresponding to the approximate pinyin of the initial text, wherein:
      the preset mapping relationship table includes a record for each word in a word database, the record including standard pinyin and approximate pinyin for the word, and a mapping relation between the standard pinyin, approximate pinyin, and the word; and
      the alternative text includes one or more words whose standard pinyin or approximate pinyin map, in the preset mapping relationship table, to the approximate pinyin of the initial text;
   matching the alternative text to the first contact; and
   performing an operation using the first contact.

8. The system of claim 7, wherein the operations further comprise:
   establishing the preset mapping relationship table, comprising, for each word in the word database:

converting the word to corresponding standard pinyin;
using the standard pinyin, generating at least one approximate pinyin according to the predetermined pronunciation similarity;
establishing the mapping relationship between the standard pinyin, the approximate pinyin, and the word; and
storing the respective mapping relationship for the word in the preset mapping relationship table.

9. The system of claim 8, wherein establishing the preset mapping relationship table further includes establishing a dictionary Trie for the standard pinyin and the at least one approximate pinyin corresponding to each word in the word database.

10. The system of claim 8, wherein the words in the word database are divided into a plurality of categories and a respective dictionary Trie is established for each of the plurality of categories.

11. The system of claim 7, wherein the preset mapping relationship table includes respective approximate pinyin of different approximation grades corresponding to each word in the word database.

12. The system of claim 11, wherein obtaining the alternative text corresponding to the approximate pinyin of the initial text further comprises:
according to a descending order of the different approximation grades, successively determining whether the standard pinyin of the initial text matches pinyin in the preset mapping relationship table; and
in accordance with a determination that the standard pinyin of the initial text matches pinyin in the preset main relationship table, obtaining, as the alternative text, text corresponding to the one or more matching pinyin identified according to the preset mapping relationship table.

13. A non-transitory computer-readable storage medium having storing instructions which, when executed by one or more processors, cause the processors to perform operations comprising:
storing a list of a user's contacts in the memory, wherein the list of the user's contacts includes a first contact;
receiving input speech information;
obtaining initial text corresponding to the input speech information and standard pinyin of the initial text;
generating at least one approximate pinyin for the initial text based on predetermined pronunciation similarity information, wherein the pronunciation similarity information identifies non-standard pronunciations based on regional dialects;
from a preset mapping relationship table stored in the memory, obtaining alternative text corresponding to the approximate pinyin of the initial text, wherein:
the preset mapping relationship table includes a record for each word in a word database, the record including standard pinyin and approximate pinyin for the word, and a mapping relation between the standard pinyin, approximate pinyin, and the word; and
the alternative text includes one or more words whose standard pinyin or approximate pinyin map, in the preset mapping relationship table, to the approximate pinyin of the initial text;
matching the alternative text to the first contact; and
performing an operation using the first contact.

14. The computer-readable medium of claim 13, wherein the operations further comprise:
establishing the preset mapping relationship table, comprising, for each word in the word database:
converting the word to corresponding standard pinyin;
using the standard pinyin, generating at least one approximate pinyin according to the predetermined pronunciation similarity;
establishing the mapping relationship between the standard pinyin, the approximate pinyin, and the word; and
storing the respective mapping relationship for the word in the preset mapping relationship table.

15. The computer-readable medium of claim 14, wherein establishing the preset mapping relationship table further includes establishing a dictionary Trie for the standard pinyin and the at least one approximate pinyin corresponding to each word in the word database.

16. The computer-readable medium of claim 14, wherein the words in the word database are divided into a plurality of categories and a respective dictionary Trie is established for each of the plurality of categories.

17. The computer-readable medium of claim 13, wherein the preset mapping relationship table includes respective approximate pinyin of different approximation grades corresponding to each word in the word database.

18. The computer-readable medium of claim 17, wherein obtaining the alternative text corresponding to the approximate pinyin of the initial text further comprises:
according to a descending order of the different approximation grades, successively determining whether the standard pinyin of the initial text matches pinyin in the preset mapping relationship table; and
in accordance with a determination that the standard pinyin of the initial text matches pinyin in the preset mapping relationship table, obtaining, as the alternative text, text corresponding to the one or more matching pinyin identified according to the preset mapping relationship table.

* * * * *